United States Patent
Kang et al.

(10) Patent No.: US 9,549,861 B2
(45) Date of Patent: Jan. 24, 2017

(54) EARLY WARNING METHOD AND DEVICE FOR PREVENTING WHEELCHAIR FROM TIPPING OVER

(71) Applicant: National Taiwan University, Taipei (TW)

(72) Inventors: Shih-Chung Kang, Taipei (TW); Pei-Chun Lin, Taipei (TW); Yung-Shun Su, Miaoli (TW); Ci-Jyun Liang, Taipei (TW); Pei-Yi Lee, Taipei (TW); Yao-Yu Yang, Taipei (TW); Kevin Lin, Taipei (TW); Chuan-En Lee, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 0 days.

(21) Appl. No.: 14/015,584

(22) Filed: Aug. 30, 2013

(65) Prior Publication Data
US 2014/0191489 A1   Jul. 10, 2014

(30) Foreign Application Priority Data
Jan. 8, 2013   (TW) .............................. 102100629 A

(51) Int. Cl.
*A61G 5/10* (2006.01)
*G08B 21/02* (2006.01)
*G05D 1/02* (2006.01)
*A61G 5/02* (2006.01)

(52) U.S. Cl.
CPC ................. *A61G 5/10* (2013.01); *G05D 1/024* (2013.01); *G08B 21/02* (2013.01); *A61G 5/02* (2013.01); *A61G 2005/1089* (2013.01); *A61G 2203/72* (2013.01)

(58) Field of Classification Search
CPC .. A61G 5/10; A61G 2005/1089; G05D 1/024; G08B 21/02
USPC ................... 280/250.1; 180/907; 297/DIG. 4
See application file for complete search history.

(56) References Cited

U.S. PATENT DOCUMENTS

| | | | |
|---|---|---|---|
| 2006/0102670 A1* | 5/2006 | Hassett et al. | A44B 19/262 224/407 |
| 2006/0201954 A1* | 9/2006 | Osugi | 220/632 |
| 2007/0204684 A1* | 9/2007 | Muhlhoff et al. | 73/146 |
| 2008/0069678 A1* | 3/2008 | Mahler et al. | 414/679 |
| 2014/0274205 A1* | 9/2014 | Goszyk | 455/556.1 |

* cited by examiner

*Primary Examiner* — Keith Frisby
(74) *Attorney, Agent, or Firm* — patenttm.us

(57) ABSTRACT

An early warning method and a device for preventing a wheelchair from tipping over are described. The early warning method includes projecting a laser light pattern, scanning the laser light pattern, making a comparison to determine whether the ground is a barrier terrain, and issuing an early warning to the user in situations of risk. The laser light pattern is projected onto the ground and compared with a standard pattern. The early warning is generated and is one selected from a group consisting of a beep, a warning message and a vibration to alert the wheelchair user to the danger of the barrier terrain.

8 Claims, 17 Drawing Sheets ions, tests and research to addition, the slope of the regression line is the basis to judge
EARLY WARNING METHOD AND DEVICE FOR PREVENTING WHEELCHAIR FROM TIPPING OVER

CROSS REFERENCE TO RELATED APPLICATIONS

This application claims benefit under 35 U.S.C. §119 of TW Application No. 102100629, filed Jan. 8, 2013, the contents of which are incorporated by reference as if fully set forth.

FIELD OF THE INVENTION

The present disclosure relates to a wheelchair, and more particularly to an early warning method and a device for preventing a wheelchair from tipping over.

BACKGROUND OF THE INVENTION

The quality of medical engineering and medical equipment need to be enhanced continuously, accompanied by the development of science and technology. Regarding the aspect of wheelchair skill related to health care, how to pursue the further enhanced safety for wheelchair users at the lowest cost is the goal that every manufacturer should be eager to accomplish. Currently, there are many aids designed for people with physical disabilities on the market, and manual wheelchairs and motorized wheelchairs are the most popular among handicapped people who are temporarily or permanently disabled. However, it has been reported in one study that 53.9% of wheelchair accidents involve the wheelchair overturning, among which up to 75.6% involve the wheelchair tumbling either forward or backward, resulting in injuries to 56.6% of wheelchair users (Chan-Chia Chang, Graduate Institute of Occupational Therapy at National Taiwan University, 2009).

A survey of various wheelchairs on the market reveals that only higher-priced wheelchairs are designed with features that prevent the wheelchair from toppling backward. Typical manual and low-priced motorized wheelchairs do not have any method to prevent the wheelchair from toppling backward. Please refer to FIG. 1, which shows a user 11 riding in a wheelchair 12. Wheelchair users may not be aware of the risk posed by a change in elevation (e.g. stairs going downward 10) largely because the user's position in the wheelchair and the inability to turn the head creates a significant blind spot to the rear. As such, wheelchair safety has substantial room to improve, and a device that can detect the road conditions behind the wheelchair is urgently needed.

The problems with the wheelchair rear blind spot amid mixed elevations are solved in the present invention. The inventors conducted experiments, tests and research to devise an early-warning method and device to prevent a wheelchair from toppling over, which not only resolves the drawback of the wheelchair rear blind spot but also promotes wheelchair safety by alerting the user to elevation changes in time to prevent an accident. Furthermore, the present invention overcomes the problems that the scanned laser light pattern needs to be matched and the laser light generator and image-sensing device need to be attached to the wheelchair itself.

SUMMARY OF THE INVENTION

In accordance with the first aspect of the present invention, an early warning method for preventing a wheelchair from toppling over is described. The early warning method includes projecting a laser light pattern, scanning the laser light pattern, making a comparison to determine whether the ground is a barrier terrain, and issuing an early warning to the user in situations of risk. The laser light pattern is projected onto the ground and compared with a standard pattern. The early warning is generated and is one selected from a group consisting of a beep, a warning message and a vibration to alert the wheelchair user to the danger of the barrier terrain.

In accordance with the second aspect of the present invention, an early warning device to prevent a wheelchair from toppling over is described. The early warning device includes a laser light generator, an image sensor and an operation unit. The laser light generator projects a laser light pattern onto the ground and the image sensor scans the laser light pattern. The operation unit has an applet installed which compares the laser light pattern with a standard pattern, determines whether the ground is a barrier terrain and generates an early warning to the wheelchair user selected from a group consisting of a beep, a warning message and a vibration to alert the user to the danger of the barrier terrain.

In accordance with the third aspect of the present invention, a wheelchair is described, which includes a wheelchair body and a miniature operation device. As the wheelchair is on the ground, the miniature operation device is mounted on the wheelchair body and determines the elevation characteristics of the surrounding terrain.

To facilitate the collection of data for the early-warning device, a Microsoft Xbox 360 Kinect unit was used because it features stereoscopic cameras to create a 3D image for light depth and an infrared sensor that detects objects in motion. The Kinect was mounted on the back of the wheelchair so that it can survey the terrain, and the data collected was processed by an algorithm with LabView from the American National Instrument, which efficiently performs the mathematical calculations and provides a simple, stable system. FIG. 2 shows the signals captured by the Kinect sensor. The left depth 20 is deeper than the right depth 21, and the distance is 6 cm. The dashed circle 22 indicates the presence of a barrier. FIG. 3 shows the results of the median value of the X coordinate axis using the median filter method and shows the data when the sensor detects various types of terrain. The gently descending straight lines indicate relatively flat terrain in contrast to the sharply spiking lines which show the presence of a significant drop-off.

Furthermore, after comparing the results of all the surveys, we used linear regression applied to the results of the median filter data to further evaluate the conditions of the terrain. The error of the regression line is very small when data from the sensor indicates flat terrain, but it widens substantially when the sensor data indicates a barrier. In addition, the slope of the regression line is the basis to judge the descent, the slopes of the flat and the descent terrains are different. Please refer to FIGS. 4(A) and 4(B) which show the optimal effects of using the algorithm described above. FIG. 4(A) shows the measured results and is contrasted with FIG. 4(B) which was traced from a frame grab taken by the video camera. The solid line of the median filter changes when the wheelchair 12 encounters a barrier 40 on the floor 41, and the dotted linear result is affected. Because the slope and error change, we can judge whether the terrain is flat or not based on the error.

To collect additional data, we used another sensor, the Sharp GP2YOA21 infrared sensor, which has a detecting range of 10~80 cm and was mounted above each of the rear wheels of the wheelchair to scan the terrain. The difference between an infrared sensor and a general laser range finder is that the infrared sensor uses a geometric method to calculate the distance, it is inexpensive and can be used indoors and outdoors regardless of the lighting conditions. The infrared sensors can scan a distance of 50 cm in the area behind the wheelchair and provide a response time of 2 seconds. FIG. 5 shows the data that indicates the presence of a barrier, where the diamond-shaped data points indicate flat terrain, and the square data points indicate the presence of a box barrier. This indicates that the detection ability of the infrared sensors is quite sensitive. FIG. 6 shows the practical test 601, where the box 60 is detected behind the wheelchair 61 because of the two infrared sensors 62 mounted behind the rear wheels.

Through the above explanation, it can be seen that there is a method and device for creating an early-warning system to help wheelchair users avoid obstacles and drop-offs that are behind them and out of their field of vision. The device of the present invention utilizes a laser light generator and an image sensor and generates a warning beep indicating the presence of a barrier terrain. The device uses an applet to compare the pattern of laser lights with a standard pattern. For purposes of illustration, the present invention can be more easily understood through the following preferred embodiments and drawings.

DETAILED DESCRIPTION OF THE PREFERRED EMBODIMENT

Figure 7:
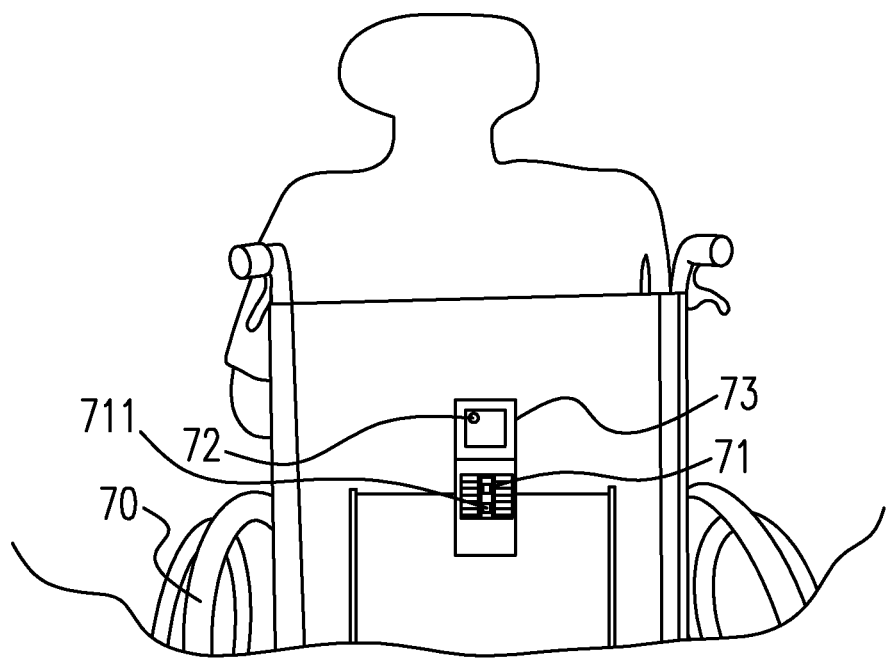
FIG. 7 is a diagram drawn from the photograph of the preferred embodiment of the early warning method and the device for preventing the wheelchair from tipping over according to the present disclosure.
Figure 8A:
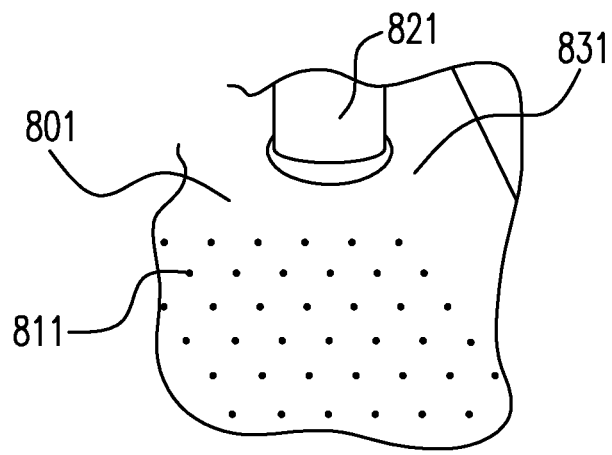
FIGS. 8(A) & 8(B) are diagrams drawn from the photographs which show the laser light patterns projected by the laser light generator onto the ground.
Figure 8B:
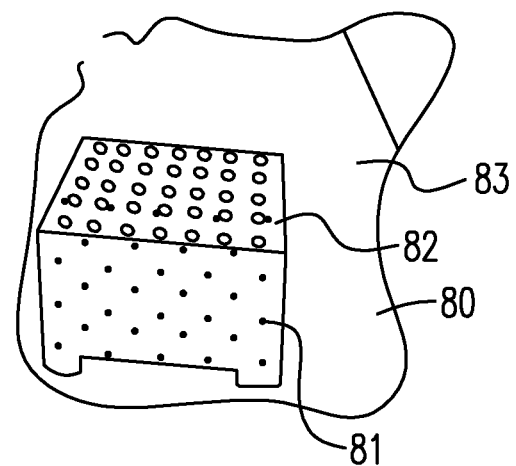

FIGS. 7, 8(A) and 8(B) show three embodiments of an early warning method and device according to the present disclosure, designed to prevent a wheelchair 70 from tipping over. Laser light patterns 81 and 811 are projected and scanned to determine whether the ground 80 and 801 have barrier terrains 82 and 821, respectively, or are free from obstacles as exemplified by ground 83 and 831. The laser light patterns 81 and 811 are compared with the standard patterns. The early warning signal is generated and is one selected from a group consisting of a beep, a warning message and a vibration to prevent wheelchair 70 from entering barrier terrains 83 and 831.

Figure 9:
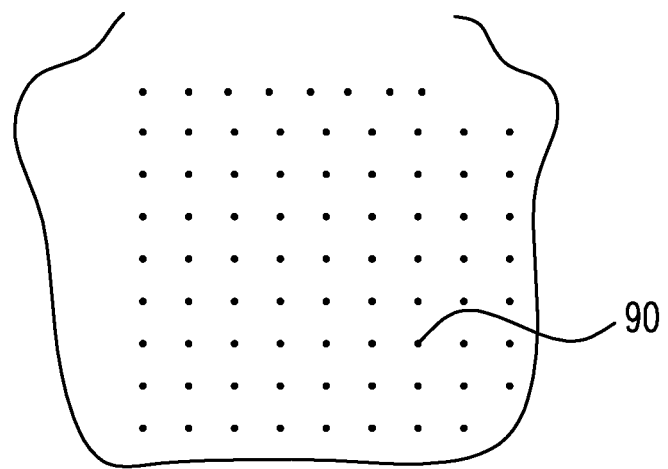
FIG. 9 is a diagram drawn from a photograph showing the correcting plane of the laser light pattern.

The early warning method further includes a step in which a downloaded applet is used to compare laser light patterns 81 and 811 with a standard pattern 90 as shown in FIG. 9. An adjustment plane (i.e. standard flat terrain) used by the software applet (APP) program is read in advance. As shown in FIG. 7, a laser light generator 71 is fixed on the wheelchair and projects the laser light patterns. Two emitting holes 711 of laser light are shown. An image sensor 72 scans the laser light patterns 81 and 811 which are special patterns using red and green laser lights, and the image sensor 72 could be the camera lens of a smartphone. Laser light generator 71 and image sensor 72 comprise the elements of the early warning device 73.

According to an aspect of the present disclosure, early warning device 73 for preventing wheelchair 70 from tipping over is included in the present invention, and device 73 determines whether ground 80 and 801 are barrier terrains. Early warning device 73 includes a laser light generator 71, an image sensor 72 and an operation unit (e.g. the apparatus inside a smartphone). Laser light generator 71 projects laser light patterns 81 and 811 on ground 80 and 801 at two different times, and image sensor 72 scans laser light patterns 81 and 811. The operation unit has a comparison applet installed therein and compares laser light patterns 81 and 811 with standard pattern 90 to determine whether ground 80 and 801 are barrier terrains such that early warning device 73 generates the early warning, which is one selected from a group consisting of a beep (e.g. the sound of the cell phone can be the feedback of the system which detects barrier terrains 83 and 831), a warning message and a vibration to prevent wheelchair 70 from entering barrier terrains 83 and 831. The occurrence of accidents, then, can be reduced.

Figure 10A:
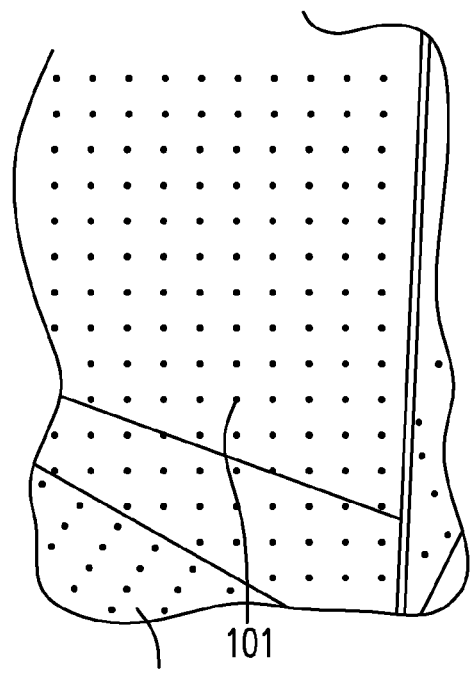
FIGS. 10(A) & 10(B) are diagrams drawn from photographs which indicate the presence of a barrier by using the laser light patterns.
Figure 10B:
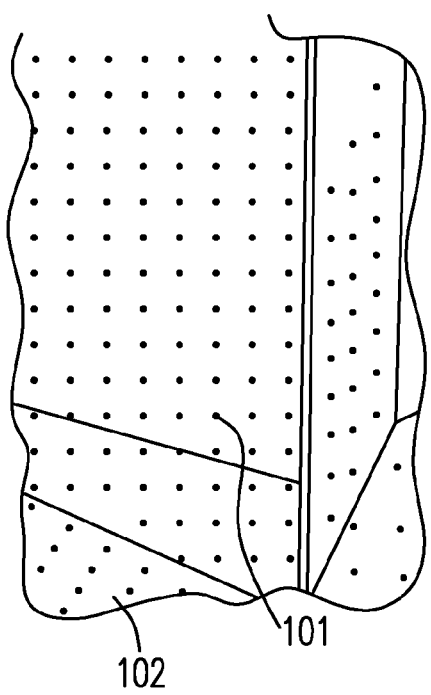
Figure 11:
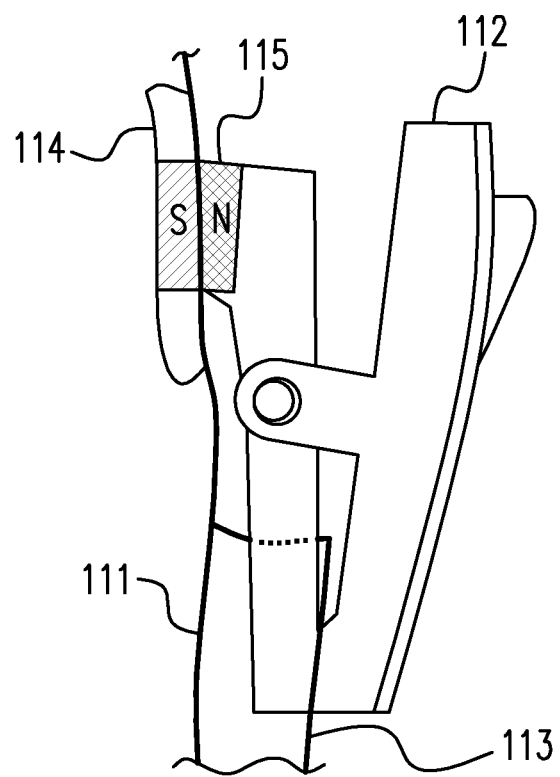
FIG. 11 is a diagram of the cross-section of the early warning device mounted on a wheelchair.
Figure 12:
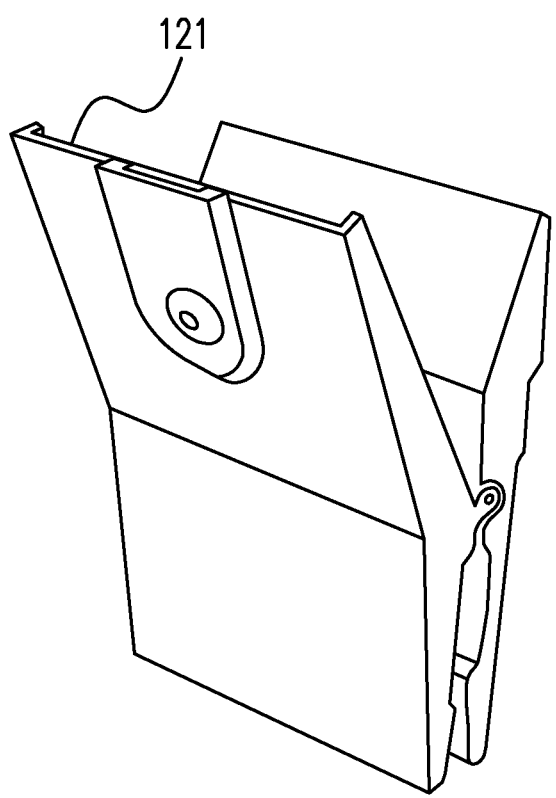
FIG. 12 is a diagram of the other preferred embodiment of the early warning method and device for preventing the wheelchair from tipping over according to the present disclosure.
Figure 13:
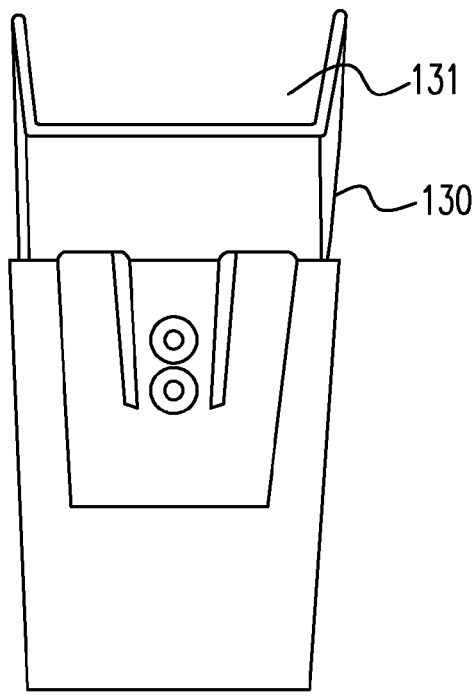
FIG. 13 is a diagram of another preferred embodiment of the early warning method and device for preventing the wheelchair from tipping over according to the present disclosure.

Referring to FIGS. 10(A) and 10(B), laser light generator 71 projects plural dots 101 of light to detect another barrier terrain 102. Referring to FIG. 11, wheelchair 70 has a back 111 and device 73 includes an attaching piece 112 (e.g. one clip) attaching to a bag 113 on back 111 (i.e. a pocket of wheelchair 70). Device 73 has a magnet 114 and a piece of iron 115 mounted thereon, and device 73 is fixed to wheelchair 70 by the attracting force between magnet 114 and iron 115. The position of magnet 114 is fixed inside back 111, and image sensor 72 is mounted on a smartphone (e.g. iPhone® or iPad®. Referring to FIG. 12, in another embodiment, the early warning device may include a front groove 121 to mount the smartphone thereon, and the smartphone is used to generate the early warning, which is one selected from a group consisting of a beep, a warning message and a vibration. Referring to FIG. 13, in yet another embodiment, an early warning device 130 includes a rear notch 131 to mount the smartphone thereon.

Figure 1:
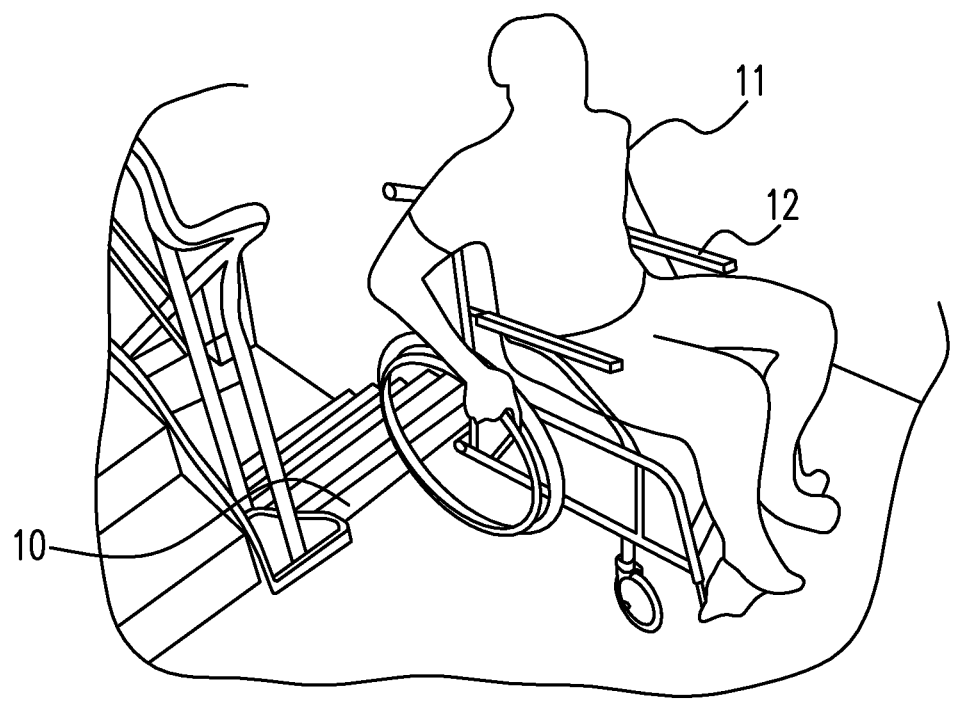
FIG. 1 is a diagram drawn from a photograph showing the circumstances where of the rear ground has a height difference as encountered by a wheelchair user according to the prior art.
Figure 2:
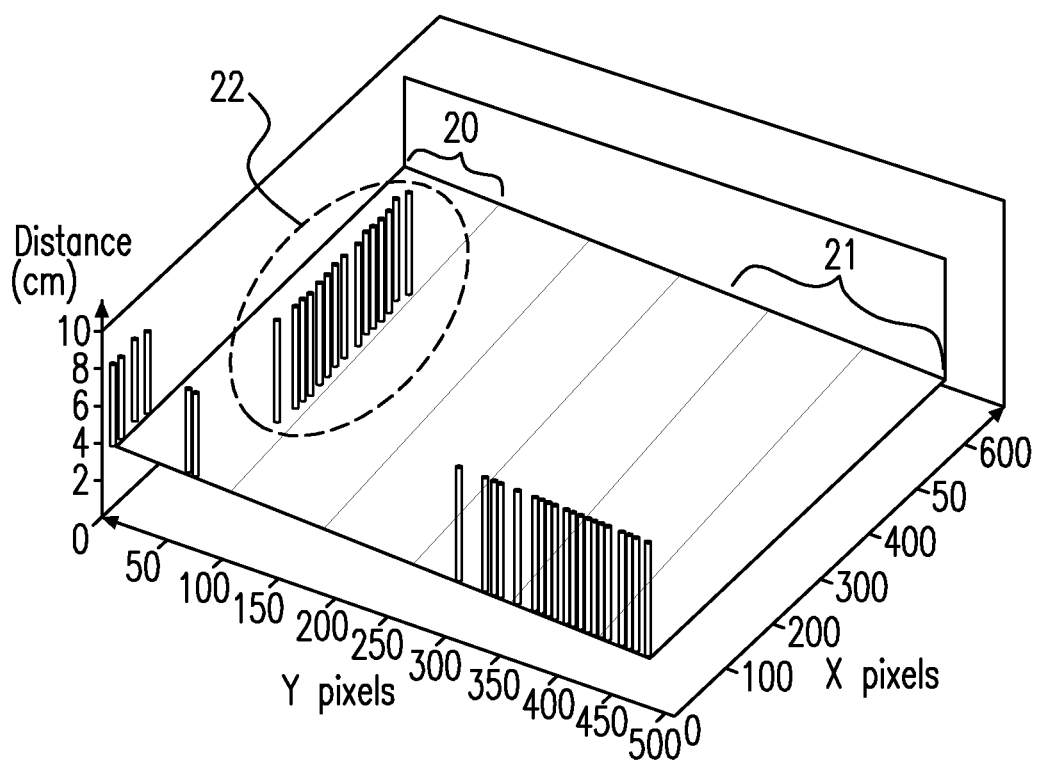
FIG. 2 is a diagram of the signal captured with the Kinect sensor.
Figure 3:
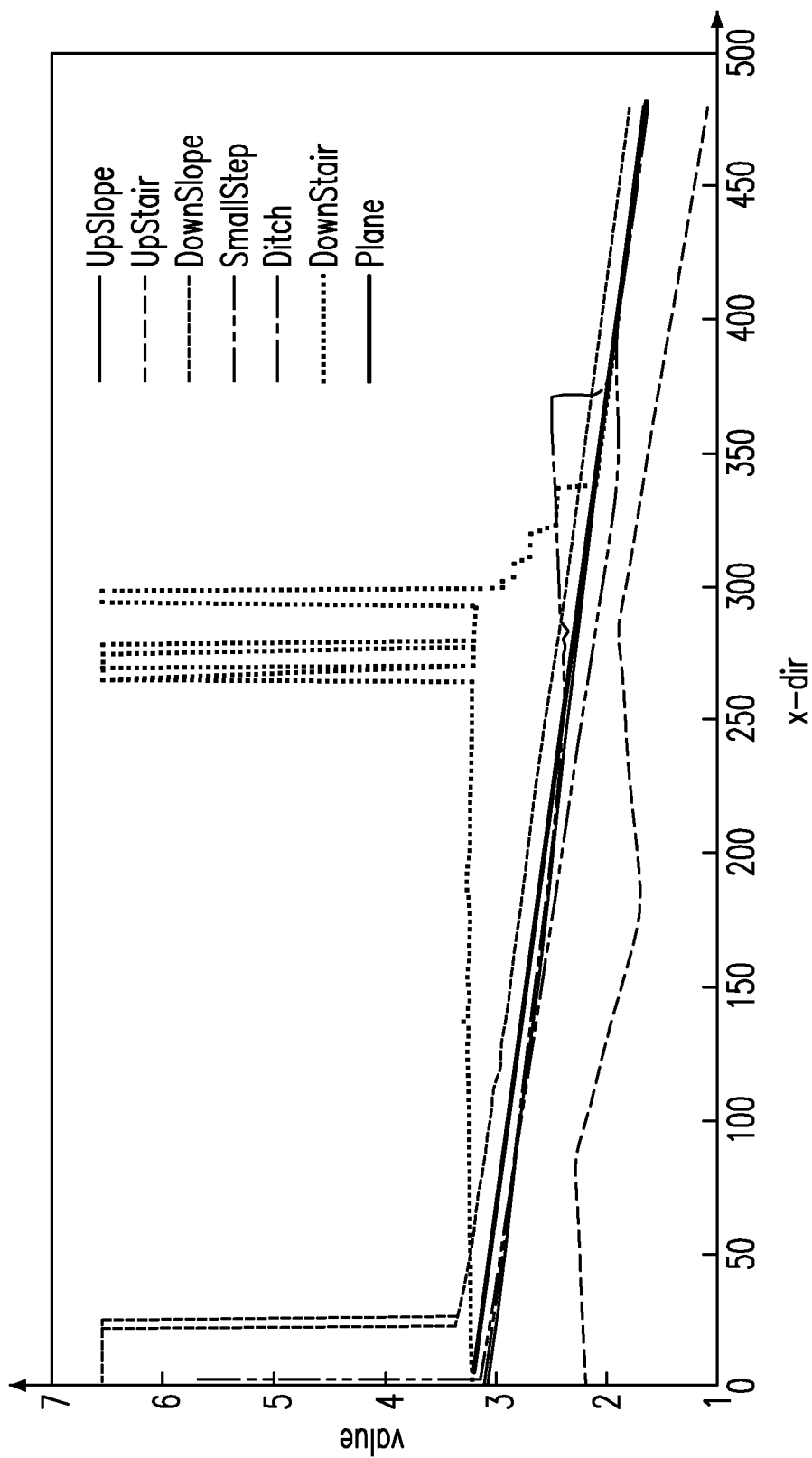
FIG. 3 is a diagram of the results obtained by using the method of the median filter and comparing the terrains.
Figure 4A:
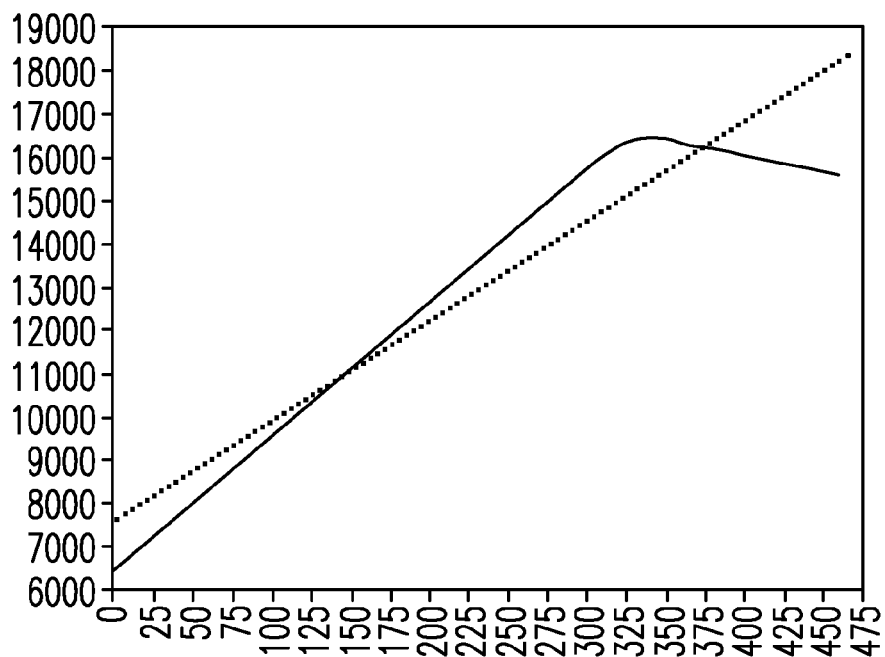
FIGS. 4(A) and 4(B) are schematic diagrams of the measured result practically surveyed by the algorithm and a schematic diagram drawn from a photograph taken by a camera.
Figure 4B:
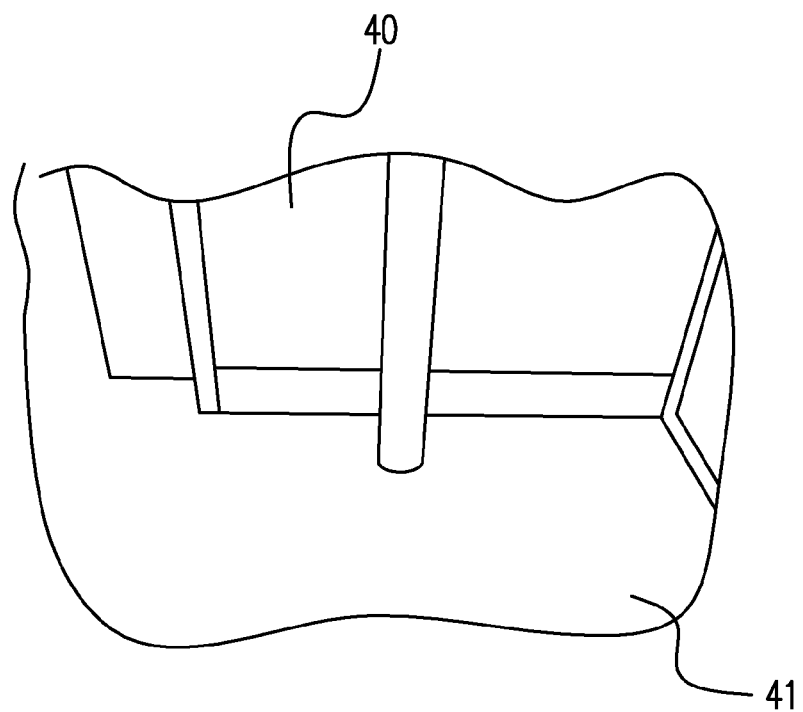
Figure 5:
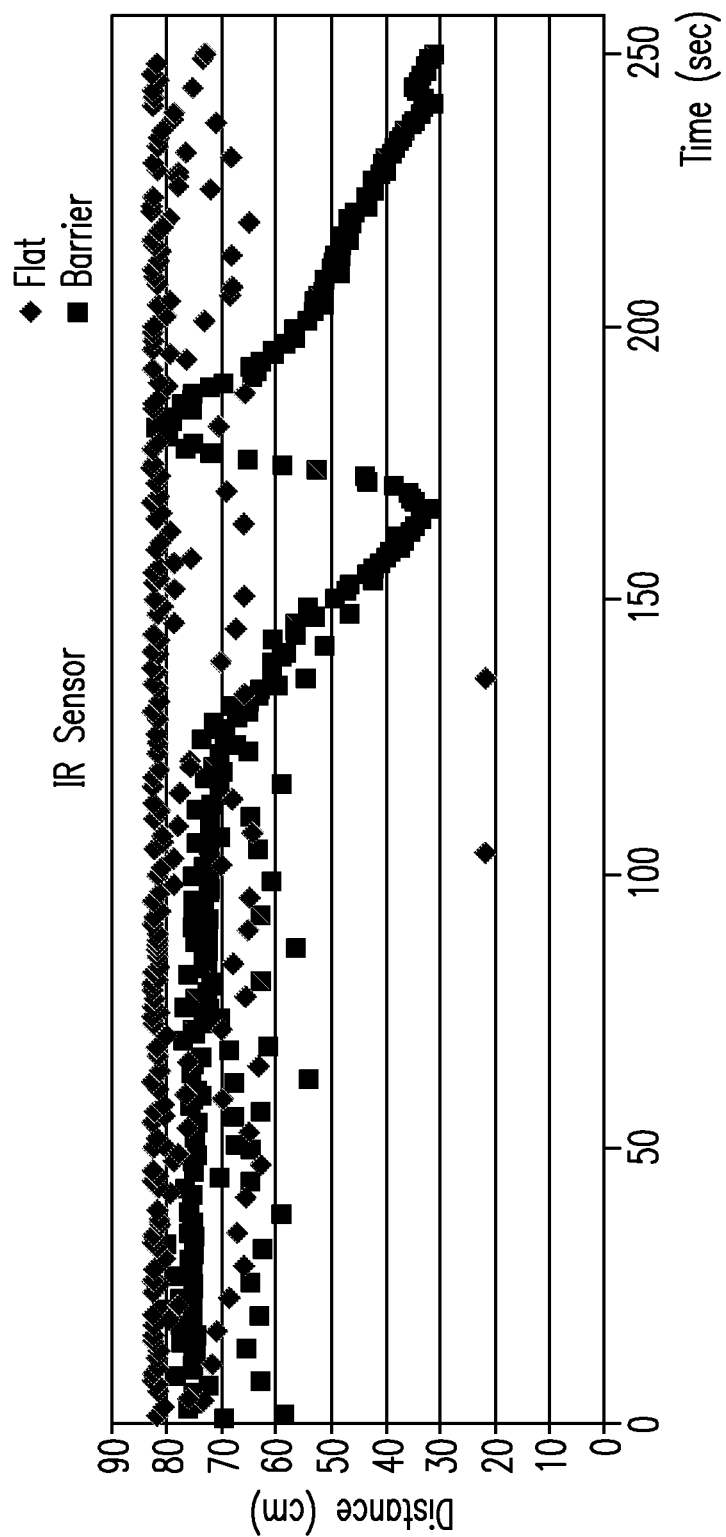
FIG. 5 is a diagram of the test results of the detecting sensitivity to the barrier by another infrared sensor.
Figure 6:
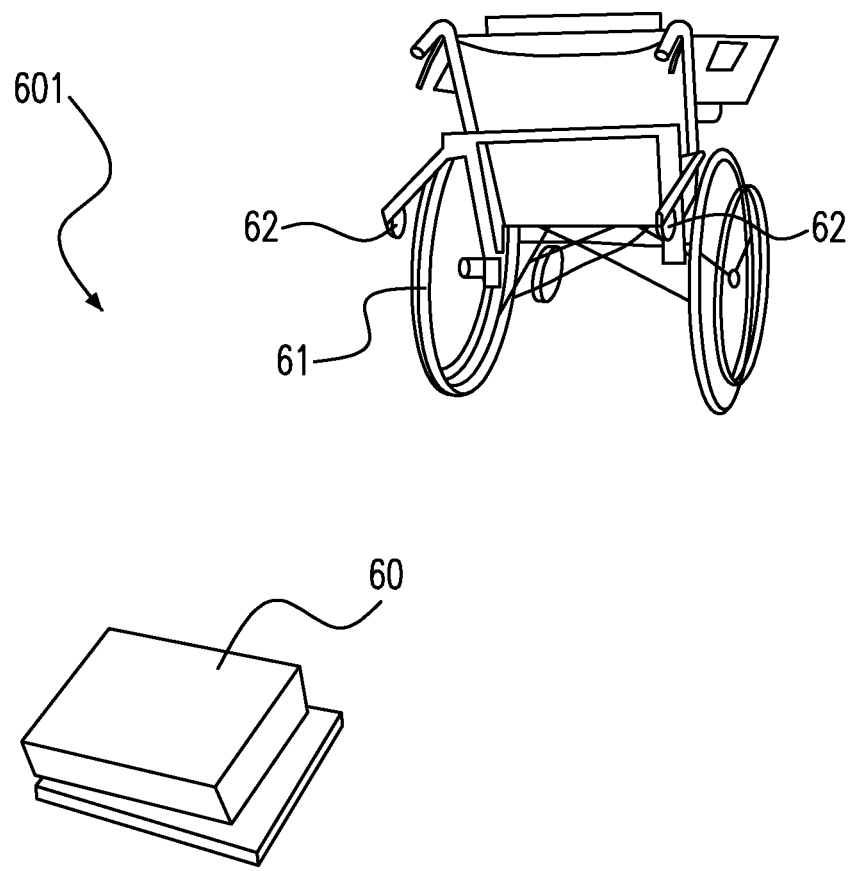
FIG. 6 is a diagram drawn from the on-site photograph of the practical test.
Figure 14:
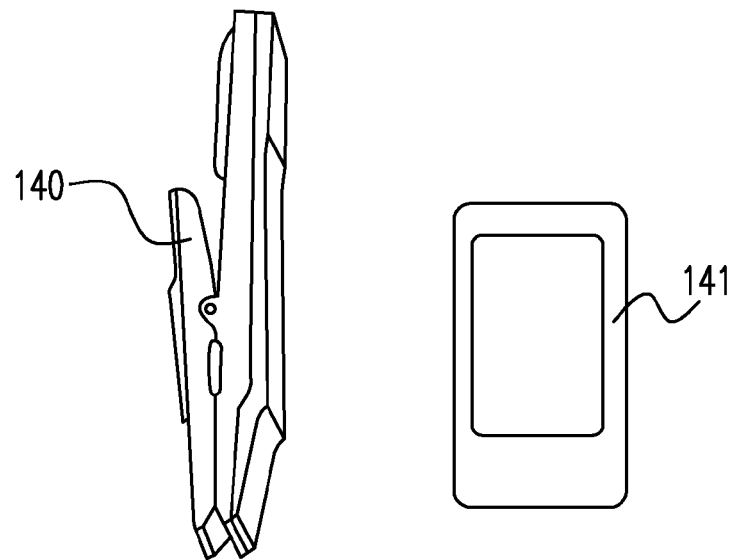
FIG. 14 is a side view diagram of the early warning device having a smartphone in FIG. 7.
Figure 15:
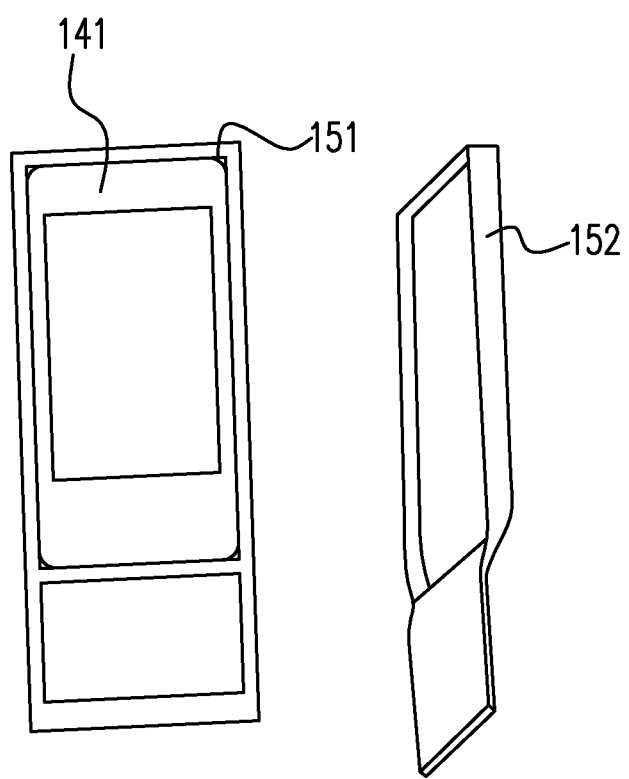
FIG. 15 is a diagram of the early warning device having a smartphone with a cover in FIG. 7.
Figure 16A:
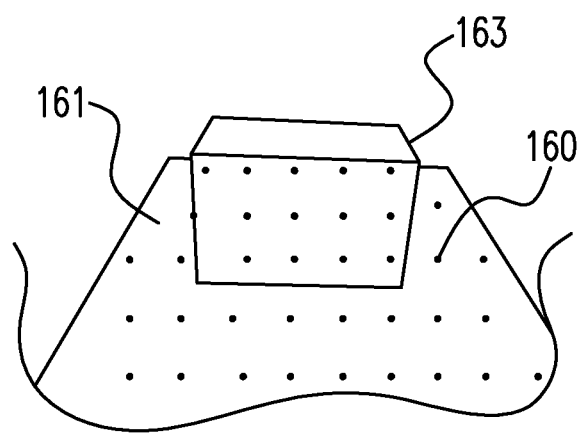
FIGS. 16(A) & 16(B) are diagrams drawn from photographs which show the pattern of the laser light dots projected from the early warning device onto a barrier and the pattern of the laser light dots shot in the dark.
Figure 16B:
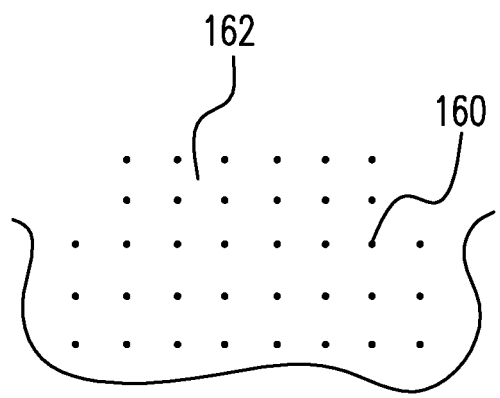
Figure 17:
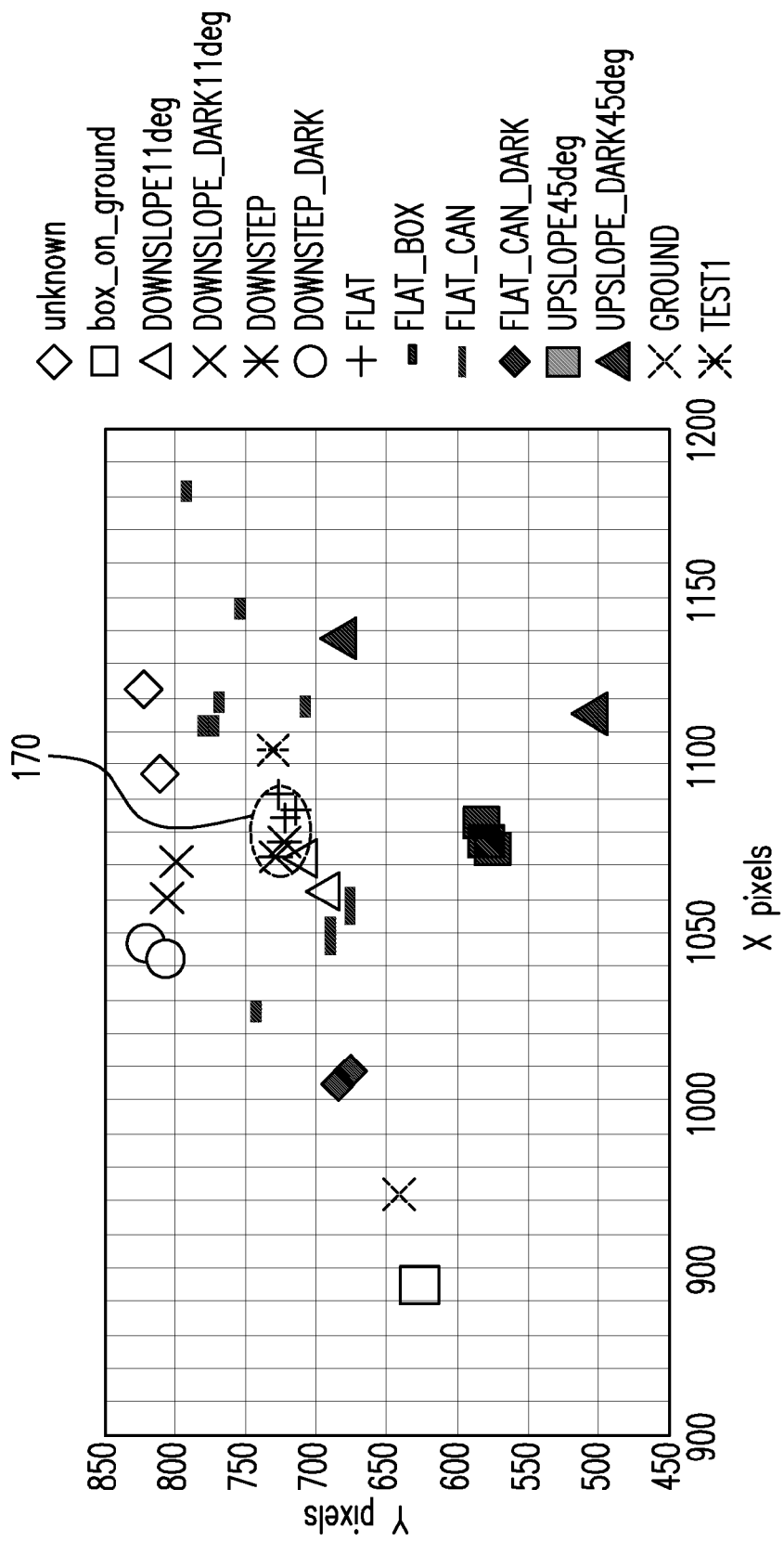
FIG. 17 is a diagram of the positions of the center of gravity for each type of terrain.

Referring to FIG. 14, an early warning device 140 (i.e. the early warning device 73 in FIG. 7) and a smartphone 141 are shown. Device 140 has a space 151 (i.e. one recess) as shown in FIG. 15 to set therein the image sensor 72. Laser light dots 160 are projected by device 140, and the pattern of the laser light dots 160 directed onto a barrier 163 is shown in FIG. 16(A). A flat terrain 162 is shown in FIG. 16(B). When there is a different terrain 161, for example, a hole, a protruding ground surface or a barrier 163, the image of laser light dots on the ground will change shape. The shape change is observed and analyzed to classify the type of terrain. This can be the basis to judge whether wheelchair 70 can pass or not. Referring to FIG. 17, there is a position figure of the center-of-gravity of the laser light dots of each terrain (e.g. a box on the ground, a down slope at 11 degrees, a dark down slope at 11 degrees, down steps 10 in FIG. 1, dark down steps, a flat (i.e. plane), a flat box, a flat can, a dark flat can, an up slope at 45 degrees, a dark up slope at 45 degrees, ground etc.). Each terrain is detected by early warning device 140. The mark "*" in the dash ellipse circle 170 means down steps. We decided to use the center-of-gravity method after comparing laser light dot figures from all of the different barriers.

Figure 18:
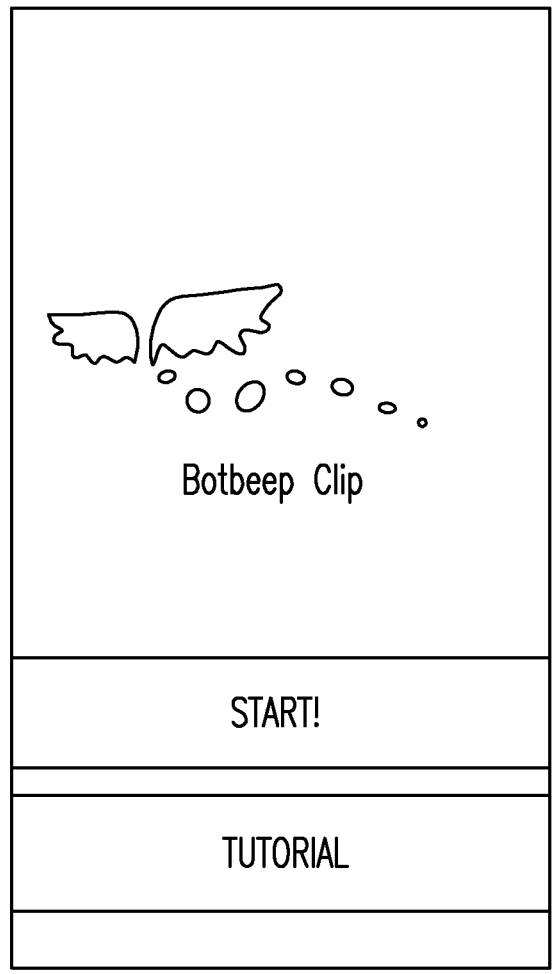
FIG. 18 is a diagram of the user interface of the comparing software applet.

The center-of-gravity algorithm calculates the position of the center of gravity based on data created by the pattern of the laser lights on each barrier, executing the calculations as follows: first, a photo is taken of the pattern of the laser lights on a flat surface to establish a baseline for comparison. Second, the gravity center position of the laser lights is calculated and recorded. Third, a photograph is take of the scene when the wheelchair is moving backward. Finally, the position of the center of gravity is calculated based on the data from the laser lights and compared with the baseline flat surface. Any comparison that exceeds the standard error is deemed dangerous terrain. The user interface for the applet, dubbed Botbeep, is shown in FIG. 18. And the price of the early warning device 140 is reasonable.

According to another aspect, the present invention is the wheelchair 70, the wheelchair 70 includes a wheelchair body and a miniature operation perceiving device (i.e. iPhone® or iPad®, etc). The wheelchair body is near ground 80 and the miniature operation perceiving device mounts on the wheelchair body, and perceives whether ground 80 is a specific terrain (e.g. barrier terrain 83).

The miniature operation perceiving device can include a laser light generator 71 and an image sensor 72. Laser light generator 71 projects a pattern 81, and image sensor 72 scans pattern 81. Wheelchair 70 further includes an attaching piece 112 to attach thereto laser light generator 71 and image sensor 72. Attaching piece 112 includes a container 151 to hold image sensor 72. Attaching piece 112 includes a cover 152 disposed on container 151 to attach thereto image sensor 72. Wheelchair 70 is ridden by a user. The miniature operation perceiving device is a terrain detector. The terrain detector generates a warning to the user through one being selected from a group consisting of a beep, a warning message and a vibration. It is more convenient to use the camera of smartphone 141 with the APP. The cost of the product can be reduced, since there is no need to mount an extra operation module. In addition, the product of the module is clipped at the rear of the chair back of the wheelchair and suits each type of wheelchair. The laser lights and the photographing function are activated when it goes backwards. The tone (i.e. the early warning sound) is played whenever a barrier is encountered. Device 140 warns the user that there is a barrier at the rear, and the path direction should be adjusted. The laser lights and the photographing function can be turned off when the wheelchair forward to reduce the amount of electricity consumed. Laser light generator 71 is a terrain detector, the early warning sound is an alert to the user.

There are further embodiments provided as follows.

Embodiment 1

In an early warning method for preventing a wheelchair from tipping over, the early warning method includes projecting a laser light pattern, scanning the laser light pattern, comparing the laser light pattern, determining whether the ground is a barrier terrain and generating an early warning. The laser light pattern is projected on a ground. The laser light pattern is compared with a standard pattern. An early warning is generated and is one selected from the group consisting of a beep, a warning message and a vibration to prevent the wheelchair from entering the barrier terrain.

Embodiment 2

In the method according to Embodiment 1, the method further includes a step of using an applet to compare the laser light pattern with the standard pattern.

Embodiment 3

In the method according to Embodiment 1 or 2, the method further includes a step of fixing on the wheelchair a laser light generator projecting the laser light pattern and an image sensor that scans the laser light pattern.

Embodiment 4

In an early warning device for preventing a wheelchair from tipping over, and determining whether a ground is a barrier terrain, the early warning device includes a laser light generator, an image sensor and an operation unit. The laser light generator projects a laser light pattern on the ground. The image sensor scans the laser light pattern. The operation unit has a comparing applet installed therein and compares the laser light pattern with a standard pattern to determine whether the ground is a barrier terrain such that the early warning device generates an early warning and is one selected from the group consisting of a beep, a warning message and a vibration to prevent the wheelchair from entering the barrier terrain.

Embodiment 5

In the device according to Embodiment 4, the laser light generator projects plural dots of light to detect the barrier terrain.

Embodiment 6

In the device according to Embodiment 4 or 5, the wheelchair has a back and the device includes an attaching piece attaching thereto a bag on the back.

Embodiment 7

In the device according to any one of Embodiments 4-6, the wheelchair and the device have a magnet and an iron mounted thereon respectively, and the device is fixed to the wheelchair by the attracting force between the magnet and the iron.

Embodiment 8

In the device according to any one of Embodiments 4-7, the image sensor is mounted on a smartphone.

Embodiment 9

In the device according to any one of Embodiments 4-8, the device further includes a front groove to mount the smartphone thereon, and the smartphone is used to generate the early warning being one selected from the group consisting of a beep, a warning message and a vibration.

Embodiment 10

In the device according to any one of Embodiments 4-9, the device further includes a rear groove to mount the smartphone thereon.

Embodiment 11

In the device according to any one of Embodiments 4-10, the device further includes a space to set therein the image sensor.

Embodiment 12

In a wheelchair, the wheelchair includes a wheelchair body and a miniature operation. The wheelchair body is near a ground. The miniature operation perceiving device mounts on the wheelchair body, and perceives whether the ground is a specific terrain.

Embodiment 13

In the wheelchair according to Embodiment 12, the miniature operation perceiving device includes a laser light generator and an image sensor.

Embodiment 14

In the wheelchair according to Embodiment 12 or 13, the laser light generator projects a pattern, and the image sensor scans the pattern.

Embodiment 15

In the wheelchair according to any one of Embodiments 12-14, the wheelchair further includes an attaching piece to attach thereto the laser light generator and the image sensor.

Embodiment 16

In the wheelchair according to any one of Embodiments 12-15, the attaching piece includes a container to hold the image sensor.

Embodiment 17

In the wheelchair according to any one of Embodiments 12-16, the attaching piece includes a cover disposed on the container to attach thereto the image sensor.

Embodiment 18

In the wheelchair according to Embodiments 12-17, the wheelchair is ridden by a user.

Embodiment 19

In the wheelchair according to Embodiments 12-18, the miniature operation perceiving device is a terrain detector.

Embodiment 20

In the wheelchair according to Embodiment 12-19, the terrain detector generates a warning to the user through one being selected from the group consisting of a beep, a warning message and a vibration.

In conclusion, a novel scheme is provided in the present invention which utilizes a laser light generator and an image sensor, then generates an early warning beep to prevent the wheelchair user from entering the barrier terrain through the use of an applet (APP) which can accomplish the goal of comparing the laser light pattern with the standard pattern.

While this disclosure describes in terms of what is presently considered to be the most practical and exemplary embodiments, it is to be understood that the disclosure need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above descriptions and illustrations should not be taken as limiting the scope of the present disclosure which is defined by the appended claims.

What we claim is:

1. An early warning device determining whether a ground around a backside of a wheelchair is a barrier terrain for preventing the wheelchair from a backside tipping over, which wheelchair has a back on which a bag used for holding the early warning device is disposed, comprising:
    a quick-release attaching piece having a containing space and configured to detachably clip to the bag;
    a laser light generator projecting a laser light pattern onto the ground;
    an image sensor scanning the laser light pattern; and
    a smart phone requiring an applet installed therein to perform an early warning function for comparing the laser light pattern with a standard pattern to determine whether the ground is the barrier terrain such that the early warning device generates an early warning being one selected from the group consisting of a beep, a warning message and a vibration to prevent the wheelchair from entering the barrier terrain, wherein the laser light generator is electrically connected to the smart phone, the image sensor is a component disposed inside the smart phone, the laser light generator and the smart phone are integratedly disposed in the containing space on the quick-release attaching piece to form the early warning device, and the early warning device is detachably mounted in the bag on the wheelchair through the quick-release attaching piece.

2. The device according to claim 1, wherein the laser light generator projects a matrix of plural dots of light to detect the barrier terrain.

3. The device according to claim 1, wherein the wheelchair and the quick-release attaching piece further have a magnet and an iron mounted thereon respectively, and the early warning device is detachably fixed to the wheelchair by the attracting force between the magnet and the iron.

4. The device according to claim 1, wherein the image sensor is mounted on the smart phone.

5. The device according to claim 1, wherein the containing space is used for containing the laser light generator and the smart phone.

6. A wheelchair capable of determining whether a ground around a backside of the wheelchair is a barrier terrain for preventing from a backside tipping over, comprising:
   a wheelchair body having a back on which a bag used for holding the early warning device is disposed; and
   an early warning device comprising a quick-release attaching piece having a containing space and configured to detachably clip to the bag, a laser light generator projecting a laser light pattern onto the ground, an image sensor scanning the laser light pattern and a smart phone requiring an applet installed therein to perform an early warning function for comparing the laser light pattern with a standard pattern to determine whether the ground is the barrier terrain such that the early warning device generates an early warning being one selected from the group consisting of a beep, a warning message and a vibration to prevent the wheelchair from entering the barrier terrain, wherein the laser light generator is electrically connected to the smart phone, the image sensor is a component disposed inside the smart phone, the laser light generator and the smart phone are integratedly disposed in the containing space on the quick-release attaching piece to form the early warning device, and the early warning device is detachably mounted in the bag on the wheelchair through the quick-release attaching piece.

7. The wheelchair according to claim 6, wherein the quick-release attaching piece comprises the containing space used for containing the laser light generator and the smart phone.

8. The wheelchair according to claim 7, wherein the quick-release attaching piece further comprises a cover to protect the laser light generator and the smart phone contained in the containing space.

* * * * *